June 14, 1927.
I. L. EASTMAN
1,632,001
OIL PURIFIER
Filed June 18, 1926  2 Sheets-Sheet 1
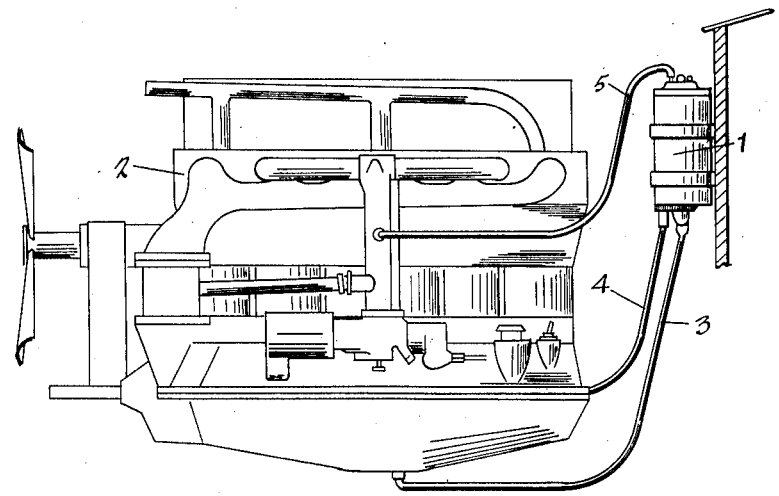
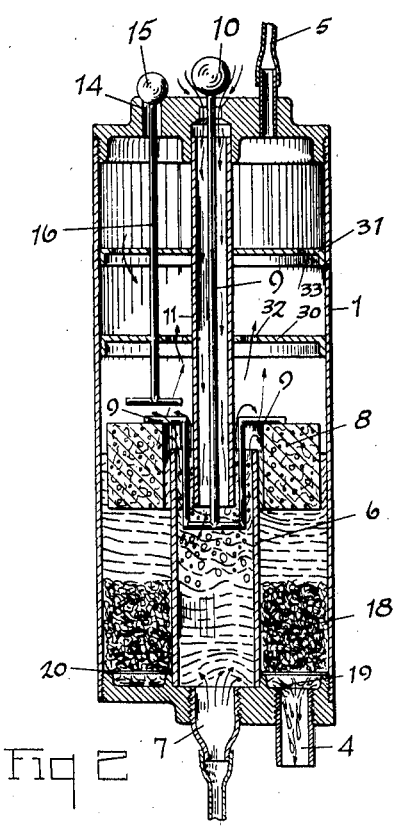
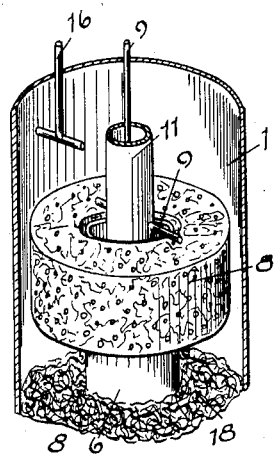
Inventor
Ivan L. Eastman
By Faust F. Crampton
Attorney June 14, 1927.
I. L. EASTMAN
1,632,001
OIL PURIFIER
Filed June 18, 1926
2 Sheets-Sheet 2
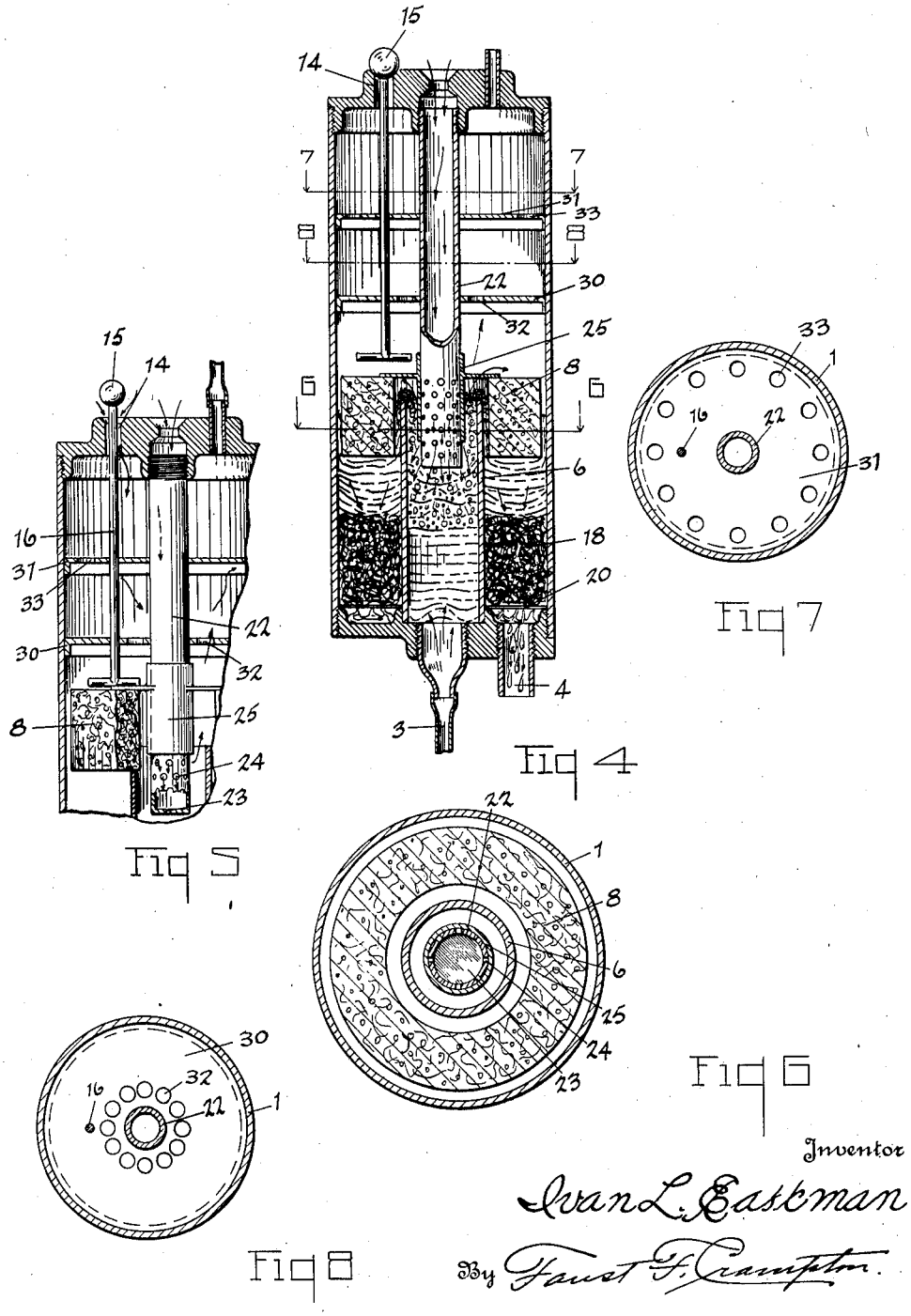

Patented June 14, 1927.

1,632,001

UNITED STATES PATENT OFFICE.

IVAN L. EASTMAN, OF TOLEDO, OHIO, ASSIGNOR OF ONE-HALF TO LE ROY E. EASTMAN, OF TOLEDO, OHIO.

OIL PURIFIER.

Application filed June 18, 1926. Serial No. 116,911.

My invention has for its object to provide a means for purifying the oil used for lubricating the relatively moving parts of internal combustion engines. The oil becomes charged with particles of metal and carbon and also becomes charged with moisture that condenses and works into the oil and becomes diluted by gasoline that is forced past the piston rings or penetrates the oil that works between the piston rings, with the result that, when oil has been used for a short period of time, it is charged with finely subdivided solid particles that in the circulation of the oil through the bearings causes grinding of the surfaces or wear and the dilution, particularly by fuel, reduces the viscosity and its lubricating properties. By my invention the foreign solid particles are separated from the oil and the diluting fluids are evaporated in order to maintain the purity of the oil and its lubricating efficiency.

The invention may be contained in structures that vary in their form and to illustrate a practical application of the invention I have selected two different forms of devices containing my invention as examples of such structures and shall describe them hereinafter. The structures selected are shown in the accompanying drawings.

Figure 1 is a side view of one form of structures that contain my invention. The figure shows the apparatus connected to an internal combustion engine. Fig. 2 illustrates a view of a section taken on a vertical plane through the oil purifier. Fig. 3 illustrates a perspective view of parts of the mechanism shown in Fig. 2. Fig. 4 is a view of a section taken on a vertical plane through a modified form of construction containing my invention. Fig. 5 is a broken view showing parts of the construction shown in Fig. 4 in an altered position. Fig. 6 is a view of a section taken on the plane of the line 6—6 indicated in Fig. 4. Fig. 7 is a view of a section taken on the plane of the line 7—7 indicated in Fig. 4. Fig. 8 is a view of a similar section on the line 8—8.

The devices selected for purposes of illustration may be used in connection with any form of internal combustion engine. In the drawings it is shown as being connected to the form of engine commonly used in driving automobiles. A container 1 is mounted in any suitable place in the automobile, that is, it may be mounted on the dash or on the engine by a suitable bracket or upon any other part of the chassis of the automobile. It is connected to the crank shaft casing of the engine 2 by suitable pipes for drawing the oil from and returning it to the crank shaft casing such as the pipes 3 and 4. If desired the container 1 may be located within the crank shaft casing, or a suitable reservoir or well may be provided for collecting the impure oil from which the oil will be drawn or directed to the container 1. In the form of construction shown in Fig. 1 of the drawings, the oil is caused to circulate through the container 1 by means of the vacuous condition produced, by the operation of the engine pistons, in the intake manifold. This vacuous condition is transmitted through the pipe 5 to the container 1 where it is controlled by suitable air valves to cause the oil to pass through the container.

The pipe 3 is connected to the bottom of the interior of the crank shaft casing or to a suitable well for receiving the impure oil and directing it to the bottom of the container 1, to which it is connected, preferably, at its center. The container 1 is provided with a sleeve or shell 6 that surrounds the oil inlet 7. Since the container 1 is below atmospheric by reason of the connection at its upper end with the intake manifold of the engine, the oil will be drawn into the sleeve 6 and except for controlled air inlets will fill the container 1. A float 8 is located in the container and is connected by a suitable wire 9 to an air inlet valve 10 which operates to control the movement of the air through the inlet. In the form of construction, the float 8 is annular in form and surrounds the sleeve 6. Consequently when the level of the oil in the container 1 fills the container exterior to the sleeve 6 to a predetermined point the float 8 operating through the wire 9 will open the valve 10 and air will enter the container which reduces its vacuous condition. This will slow down or stop the movement of the oil through the pipe 3 into the container. The air inlet is preferably located below that level of the oil to which it is raised by the suction produced by the engine, and to which it is permitted to rise before the float 8 operates to reduce the vacuous condition within the container. In the form of construction shown, the container is provided with a tube 11 that is secured in the top of the container. The lower end of the tube 11 is located below this predetermined float controlled level and its lower end forms the air inlet. The movement of the air through the tube and consequently through the oil located above the lower end of the tube is controlled by means of the valve 10. In order to operate the valve 10 it is preferably connected to the upper end of the wire 9 which extends downwardly through the tube 11 and is bent laterally and upwards and again laterally so as to be engaged by the float 8. In order to direct the air through practically all of the oil that enters the container the tube 11 extends into the sleeve 6 a short distance and consequently as the air is drawn through the tube 11, that is, through the air inlet and through the oil, the oil is thoroughly aerated and all volatile liquids such as water and gasoline will be drawn from the oil and directed through the pipe 5 into the manifold of the engine from whence it will be evacuated through the exhaust.

The flow of the air through the tube 11 to a point below the level of the oil is somewhat restricted and in order to obtain a positive control of the vacuous condition within the container, an auxiliary air inlet is provided which will produce a positive limit of the upward movement of the oil within the container. The second air inlet 14 is located in the top of the container and is closed by a valve member 15 that is operated by the float 8 when the float is raised above a predetermined point that is preferably slightly higher than that at which the air inlet valve 10 is opened by the operation of the float. The valve member 15 may be located on the end of a wire 16 that extends or hangs downward from the valve member 15, its lower end being located in position so that it would be operated upon by the float 8 when it rises above a predetermined point.

In order to remove the foreign solid particles, filtering material of any suitable form, such as, a fibrous material 18, is located in the bottom of the container and on the outside of the sleeve 6. The pipe 4 is connected to the bottom of the container where it communicates with a channel 19 which extends around the sleeve 6 and is located below the fibrous material 18. A suitable grid or screen 20 may be used to cover the channel to prevent the entrance of the fibrous material to the channel and consequently prevent clogging of the channel. The channel 19 forms a passageway for collecting the oil that passes through the filtering material 18. The pipe 4 is connected to a part of the casing remote from the end of the pipe 3 so as to avoid short circuiting of the purified oil across the ends of the pipes 3 and 4.

In the form of construction shown in Figs. 4, 5 and 6, the tube 22 which corresponds to the tube 11 in the form of construction shown in Figs. 1, 2 and 3, is closed at its lower end as at 23 except for a plurality of openings 24 that are formed through the wall of that portion of the tube located within the sleeve 6. The openings 24 are covered by a sleeve 25 that is shifted by means of the float 8 whereby more or less of the openings are uncovered as the level of the oil in the container is raised. By this means the amount of air that is directed through the oil is directly varied according to the changes of the level of the oil in the container. In the device shown in Figs. 4, 5, and 6 the air valve 15 is used for controlling the auxiliary inlet 14 in case the restriction put upon the influx of the air through the tube 22 is too great to prevent the oil rising above a desired level.

The level of the oil in the containers of the figures is thus maintained substantially constant while the oil circulates therethrough. The oil movement is due to the difference of the hydrostatic pressure created by the difference in the level of the oil within and without the sleeve 6 in each case, or more exactly, the difference in the height of the liquid on the outside of the sleeve 6 and substantially the mid-point of that portion of the oil within the sleeve 6 that is filled with air bubbles that forms about the air that enters through the tube 11 in one form of structure and the tube 22 in the other form of structure.

To prevent the oil entering the vacuum pipe 5 by reason of splashing of oil due to car movement, suitable baffle plates 30 and 31 having openings 32 and 33 are located well above the sleeve 6. Preferably the holes 32 are located in the central portion of the plate 30 and the holes 33 are located in the peripheral region of the plate 31.

I claim:

1. In an oil purifier for internal combustion engines, a container connected to the crank shaft casing of the engine and for containing crank case oil, means for producing a vacuous condition in the container, the container having an air inlet located below the level of the oil in the container for directing air through a portion of the oil in the container and means for controlling the flow of air through the oil according to the level of the oil in the container.

2. In an oil purifier for internal combustion engines, a container connected to the crank shaft casing of the engine and for containing crank case oil, means for producing a vacuous condition in the container, the container having an air inlet located below the level of the oil in the container for directing air through a portion of the oil in the container, a float, a valve operated by the float for controlling the flow of air through the oil.

3. In an oil purifier for internal combustion engines, a container connected to the crank shaft casing of the engine and for containing crank case oil, means for producing a vacuous condition in the container, the container having an air inlet located below the level of the oil in the container for directing air through a portion of the oil in the container, a float, a valve operated by the float for admitting air through the air inlet when the level of the oil reaches a predetermined height.

4. In an oil purifier for internal combustion engines, a container connected to the crank shaft casing of the engine and for containing crank case oil, means for producing a vacuous condition in the container, the container having an air inlet located below the level of the oil in the container for directing air through a portion of the oil in the container, the container having a second air inlet, a float, a valve operated by the float for controlling the vacuous condition according to the level of the oil.

5. In an oil purifier for internal combustion engines, a container connected to the crank shaft casing of the engine and for containing crank case oil, means for producing a vacuous condition in the container, the container having an air inlet located below the level of the oil in the container for directing air through a portion of the oil in the container, the container having a second air inlet and an oil outlet, a float, a valve operated by the float for opening the said valve when the level of the oil reaches a predetermined height to permit the oil to pass through the said outlet.

6. In an oil purifier for internal combustion engines, a container connected to the crank shaft casing of the engine and for containing crank case oil, means for producing a vacuous condition in the container, the container having an air inlet located below the level of the oil in the container for directing air through a portion of the oil in the container, the container having an oil outlet, a float, a valve operated by the float for varying the effective area of the air inlet and control the flow of air through the oil and the flow of oil through the outlet.

7. In an oil purifier for internal combustion engines, a container connected to the crank shaft casing of the engine and for containing crank case oil, means for producing a vacuous condition in the container, the container having an air inlet located below the level of the oil in the container for directing air through a portion of the oil in the container, the container having a second air inlet, a float, a valve operated by the float for varying the effective area of the said second air inlet for controlling the vacuous condition in the container according to the level of the oil.

8. In an oil purifier for internal combustion engines, a container connected to the crank shaft casing of the engine and for containing crank case oil, means for producing a vacuous condition in the container, the container having an air inlet located below the level of the oil in the container for directing air through a portion of the oil in the container, the container having a second air inlet, the container having an oil outlet, a float, a valve for varying the effective area of the said second air inlet to control the vacuous condition within the container according to the level of the oil and the flow of the oil through the said outlet.

9. In an oil purifier for internal combustion engines, a container connected to the crank shaft casing of the engine and for containing crank case oil, means for producing a vacuous condition in the container, the container having an air inlet located below the level of the oil in the container for directing air through a portion of the oil in the container, the container having a second air inlet and an oil outlet, a float, valves for varying the effective areas of the said inlets and operated by the float for controlling the flow of oil through the container.

10. In an oil purifier for internal combustion engines, a container connected to the crank shaft casing of the engine and for containing crank case oil, means for producing a vacuous condition in the container, the container having an air inlet located below the level of the oil in the container for directing air through a portion of the oil in the container, the container having a second air inlet and an oil outlet, a float, valves for varying the effective areas of the said inlets and operated by the float in sequence for controlling the flow of oil through the container and the movement of the air through the oil.

11. In an oil purifier for internal combustion engines, a container connected to the crank shaft casing of the engine and for containing crank case oil, means for producing a vacuous condition in the container, the container having an air inlet located below the level of the oil in the container for directing air through a portion of the oil in the container, the container having a second air inlet and an oil outlet, a float, valves for varying the effective areas of the said inlets and operated by the float in sequence for controlling the flow of oil through the container and the movement of the air through the oil, a filtering material located in the path of movement of the oil.

12. In an oil purifier for internal combustion engines, a container connected to the crank shaft casing of the engine and for containing crank case oil, means for producing a vacuous condition in the container, the container having an air inlet located below the level of the oil in the container for directing air through a portion of the oil in the container, and means for varying the vacuous condition of the container according to the level of the oil in the container.

In testimony whereof I have hereunto signed my name to this specification.

IVAN L. EASTMAN.